United States Patent
Wang et al.

(10) Patent No.: US 11,031,159 B2
(45) Date of Patent: Jun. 8, 2021

(54) CERAMIC MATERIAL, VARISTOR AND METHODS OF PREPARING THE CERAMIC MATERIAL AND THE VARISTOR

(71) Applicant: TDK Electronics AG, Munich (DE)

(72) Inventors: Yongli Wang, Frauental (AT); Jianxin Wu, Zhuhai (CN); Wenbin Yi, Zhuhai (CN)

(73) Assignee: TDK ELECTRONICS AG, München (DE)

( * ) Notice: Subject to any disclaimer, the term of this patent is extended or adjusted under 35 U.S.C. 154(b) by 151 days.

(21) Appl. No.: 16/085,940

(22) PCT Filed: Mar. 14, 2017

(86) PCT No.: PCT/EP2017/055989
§ 371 (c)(1),
(2) Date: Sep. 17, 2018

(87) PCT Pub. No.: WO2017/157937
PCT Pub. Date: Sep. 21, 2017

(65) Prior Publication Data
US 2019/0103206 A1    Apr. 4, 2019

(30) Foreign Application Priority Data

Mar. 17, 2016    (DE) .......................... 102016104990.5

(51) Int. Cl.
*H01C 7/00*    (2006.01)
*H01B 1/08*    (2006.01)
(Continued)

(52) U.S. Cl.
CPC ............ *H01C 7/112* (2013.01); *C01B 13/363* (2013.01); *C01G 9/02* (2013.01); *C04B 35/016* (2013.01);
(Continued)

(58) Field of Classification Search
CPC .. H01B 1/00; H01B 1/08; C04B 35/01; C04B 35/453; H01C 7/00; H01C 7/112
See application file for complete search history.

(56) References Cited

U.S. PATENT DOCUMENTS 4,160,748 A * 7/1979 Yodogawa ............. H01C 7/112
                                                             252/519.5
4,675,644 A    6/1987 Ott et al.
(Continued)

FOREIGN PATENT DOCUMENTS

CN            86102994 A    10/1986
CN            1988064 A     6/2007
(Continued)

OTHER PUBLICATIONS

Kubota et al "Effect of Si and Ba Addition on ZnO Grain Growth . . . ", Key Engineering Materials, vol. 566, pp. 219-222 (2013).*

(Continued)

*Primary Examiner* — Mark Kopec
(74) *Attorney, Agent, or Firm* — Slater Matsil, LLP

(57) ABSTRACT

A ceramic material, a varistor and methods for forming a ceramic material and a varistor are disclosed. In an embodiment, a ceramic material includes ZnO as a main component and additives selected from the group consisting of an $Al^{3+}$-containing solution, a $Ba^{2+}$-containing solution, and at least one compound containing a metal element, wherein the metal element is selected from the group consisting of Bi, Sb, Co, Mn, Ni, Y, and Cr.

20 Claims, 4 Drawing Sheets

(51) Int. Cl.

| | | |
|---|---|---|
| *C04B 35/453* | (2006.01) | |
| *H01C 7/112* | (2006.01) | |
| *C04B 35/626* | (2006.01) | |
| *C04B 41/00* | (2006.01) | |
| *C04B 41/51* | (2006.01) | |
| *C01G 9/02* | (2006.01) | |
| *C04B 41/88* | (2006.01) | |
| *C01B 13/36* | (2006.01) | |
| *C04B 35/01* | (2006.01) | |
| *C04B 111/00* | (2006.01) | |

(52) U.S. Cl.
CPC ...... *C04B 35/453* (2013.01); *C04B 35/62655* (2013.01); *C04B 41/009* (2013.01); *C04B 41/5116* (2013.01); *C04B 41/5155* (2013.01); *C04B 41/88* (2013.01); *H01B 1/08* (2013.01); *C01P 2002/32* (2013.01); *C01P 2002/50* (2013.01); *C01P 2002/52* (2013.01); *C04B 2111/00844* (2013.01); *C04B 2235/3215* (2013.01); *C04B 2235/3217* (2013.01); *C04B 2235/3225* (2013.01); *C04B 2235/3241* (2013.01); *C04B 2235/3263* (2013.01); *C04B 2235/3277* (2013.01); *C04B 2235/3279* (2013.01); *C04B 2235/3294* (2013.01); *C04B 2235/3298* (2013.01); *C04B 2235/445* (2013.01); *C04B 2235/656* (2013.01); *C04B 2235/80* (2013.01); *C04B 2235/96* (2013.01)

(56) References Cited

U.S. PATENT DOCUMENTS

| | | | |
|---|---|---|---|
| 4,767,729 A * | 8/1988 | Osman | H01C 7/112 264/616 |
| 5,039,452 A * | 8/1991 | Thompson | C01B 13/363 252/519.51 |
| 5,143,711 A | 9/1992 | Kluge et al. | |
| 5,614,138 A * | 3/1997 | Yamada | H01C 7/112 264/616 |
| 5,807,510 A | 9/1998 | Furuse et al. | |
| 5,973,589 A | 10/1999 | Wu et al. | |
| 7,713,350 B2 | 5/2010 | Yadav | |
| 9,741,477 B2 | 8/2017 | Okamoto et al. | |
| 9,812,235 B2 | 11/2017 | Matsuzaki et al. | |
| 2002/0121960 A1 | 9/2002 | Ando et al. | |
| 2005/0143262 A1 | 6/2005 | Hirose et al. | |
| 2007/0273469 A1 * | 11/2007 | Lien | H01C 7/112 338/21 |
| 2008/0156228 A1 | 7/2008 | Yadav | |
| 2009/0160600 A1 | 6/2009 | Yanagida et al. | |
| 2011/0079755 A1 | 4/2011 | Greuter et al. | |
| 2015/0083822 A1 | 3/2015 | Mecuson et al. | |

FOREIGN PATENT DOCUMENTS

| | | | |
|---|---|---|---|
| CN | 100463079 C | | 2/2009 |
| CN | 101367649 A | | 2/2009 |
| CN | 102034581 A | | 4/2011 |
| CN | 103030390 A | | 4/2013 |
| CN | 104937046 A | | 9/2015 |
| CN | 106892653 A | * | 6/2017 |
| CN | 107473731 A | * | 12/2017 |
| EP | 0431284 A2 | | 6/1991 |
| EP | 0289582 B1 | | 2/1992 |
| EP | 1798741 A1 | | 6/2007 |
| EP | 0961300 B1 | | 11/2007 |
| EP | 2124233 A1 | | 11/2009 |
| JP | S5325897 A | | 3/1978 |
| JP | S5385400 A | | 7/1978 |
| JP | S5726403 A | | 2/1982 |
| JP | S57193002 A | | 11/1982 |
| JP | S5850703 A | | 3/1983 |
| JP | S61170005 A | | 7/1986 |
| JP | S62293702 A | | 12/1987 |
| JP | H06260304 A | | 9/1994 |
| JP | H11340009 A | | 12/1999 |
| JP | 2000232005 A | | 8/2000 |
| JP | 2001307909 A | | 11/2001 |
| JP | 2002217006 A | | 8/2002 |
| JP | 2004022976 A | | 1/2004 |
| JP | 2004026562 A | | 1/2004 |
| JP | 2004119762 A | | 4/2004 |
| JP | 2004140334 A | | 5/2004 |
| JP | 2007043133 A | | 2/2007 |
| JP | 2007329175 A | | 12/2007 |
| JP | 2008162820 A | | 7/2008 |
| JP | 2009283892 A | | 12/2009 |
| WO | 2015083822 A1 | | 6/2015 |

OTHER PUBLICATIONS

Fukano, T. et al., "Development of GIS Type Surge Arrester Applying Ultra High Voltage Gradient ZnO Element," PES T&D 2012, IEEE, Aug. 27, 2012, 5 pages.

Lin Guozong "Formation and Control of Ba-rich Grain Boundary Phase in ZnO Varistor Ceramics," Chinese Science Bulletin, May 9, 1996, 11 pages.

\* cited by examiner

CERAMIC MATERIAL, VARISTOR AND METHODS OF PREPARING THE CERAMIC MATERIAL AND THE VARISTOR

This patent application is a national phase filing under section 371 of PCT/EP2017/055989, filed Mar. 14, 2017, which claims the priority of German patent application 10 2016 104 990.5, filed Mar. 17, 2016, each of which is incorporated herein by reference in its entirety.

TECHNICAL FIELD

The invention relates to a ceramic material and a varistor comprising a ceramic body containing a sintered ceramic material. Further, it relates to a method of preparing the ceramic material and a method of preparing a varistor comprising a ceramic body made of the ceramic material.

BACKGROUND

Size reduction of power transmission and conversion devices is demanded with the enhanced capacity of power substations and development of underground stations. As a consequence, gas-insulated switchgear (GIS) surge varistors of smaller size and/or simpler structure are required to follow the trend and to reduce the consuming of $SF_6$ and housing materials. Such requirements call for a new generation of the key components, metal oxide varistors (MOV), of which the height should be appreciably reduced for a given protection voltage.

To fulfill the height reduction of MOVs several properties of the ceramic material, of which the MOV is made, have to be improved.

SUMMARY OF THE INVENTION

Embodiments of the invention provide a ceramic material with improved properties to be used in a varistor and to provide a varistor containing a ceramic body made of such a ceramic material. Further embodiments provide methods of preparing the ceramic material and of preparing a varistor.

According to at least one embodiment a ceramic material is provided comprising ZnO as a main component, and additives being chosen from a group comprising an $Al^{3+}$-containing solution, a $Ba^{2+}$-containing solution, and at least one compound containing a metal element, wherein the metal element is chosen from a group comprising Bi, Sb, Co, Mn, Ni, Y, and Cr.

"Ceramic material" is to be understood as a composition of components that is prepared in a way that it only has to be sintered to become a ceramic. Bodies formed of the ceramic material may be called green bodies. When the ceramic material is sintered a ceramic is formed which has properties dependent on the composition of the ceramic material.

The additives that are added to the main component ZnO may comprise one compound containing a metal element, or several compounds, each containing a metal element, wherein the metal elements can be different in each compound. For example, there can be a compound containing Bi, a compound containing Sb, and a compound containing Co as additives in the ceramic material.

The additives $Al^{3+}$-containing solution and $Ba^{2+}$-containing solution are to be understood as starter materials being added to the main component ZnO. Alternatively, these additives can be named $Al^{3+}$ and $Ba^{2+}$, respectively, which are added in form of an $Al^{3+}$-containing solution and a $Ba^{2+}$-containing solution when preparing the ceramic material.

The content of the additives in the ceramic material is according to one embodiment ≤5 mol %. It is to be understood that the content of all additives together is ≤5 mol %. This is reduced content of additives compared to ceramics of the prior art having typically additives with an amount of 5 to 7 mol %. The low content of additives in the ceramic material results in a low content of secondary phases in the sintered ceramic which enhances the effective ZnO phase and ZnO—ZnO grain boundaries leading to higher volume efficiency of the varistor ceramics.

According to one embodiment, in the ceramic material $c_1$ is the equivalent content of Co in $Co_3O_4$, m is the equivalent content of Mn in $Mn_3O_4$, s is the equivalent content of Sb in $Sb_2O_3$, $c_2$ is the equivalent content of Cr in $Cr_2O_3$, a is the content of $Al^{3+}$, y is the equivalent content of Y in $Y_2O_3$, $b_1$ is the equivalent content of Bi in $Bi_2O_3$, n is the equivalent content of Ni in NiO, $b_2$ is the content of $Ba^{2+}$, and z is the content of ZnO and it is:

0.40 mol % ≤ $b_1$ ≤ 0.55 mol %,
1.10 mol % ≤ s ≤ 1.90 mol %,
0.50 mol % ≤ $c_1$ ≤ 0.80 mol %,
0.20 mol % ≤ m ≤ 0.30 mol %,
0.70 mol % ≤ n ≤ 1.20 mol %,
0.25 mol % ≤ y ≤ 0.45 mol %,
0.00 mol % ≤ $c_2$ ≤ 0.10 mol %,
0.003 mol % ≤ a ≤ 0.006 mol %, and
0.005 mol % ≤ $b_2$ ≤ 0.015 mol %.

In case that as compounds containing a metal element the above mentioned oxides are chosen, $b_1$ also corresponds to the content of $Bi_2O_3$, s also corresponds to the content of $Sb_2O_3$, $c_1$ also corresponds to the content of $Co_3O_4$, m also corresponds to the content of $Mn_3O_4$, n also corresponds to the content of NiO, $c_2$ also corresponds to the content of $Cr_2O_3$, and y also corresponds to the content of $Y_2O_3$.

Further, $(c_1+5c_2+2s+4y-m-250a)(1-z)/b_1$ may be called composition factor F and it applies 0.27 ≤ F ≤ 0.43. The relationship of the contents of the different additives in the ceramic material is responsible for the grain size control and the formation of grain boundary potential during sintering of the ceramic material in order to achieve an ultra-high varistor gradient ($E_{1mA}$) of the sintered ceramic from 480 V/mm inclusive to 640 V/mm inclusive. The varistor gradient is the characteristic varistor voltage per mm.

The correlation between the contents of additives and varistor gradient enables the minimization of varistor inactive phases in the sintered ceramic, e.g., spinel phases $Zn_7Sb_2O_{12}$, by simultaneously and properly changing the related elements for a desired varistor gradient. As a result, the volume efficiency of the sintered ceramic can be enhanced with more effective ZnO—ZnO grain boundaries.

Further, the at least one compound may be chosen from the group containing metal oxides, metal carbonates, metal acetates, metal nitrides and mixtures thereof. The at least one compound may be chosen from the group containing $Bi_2O_3$, $Sb_2O_3$, $Co_3O_4$, $Mn_3O_4$, NiO, $Y_2O_3$, and $Cr_2O_3$. For example, all compounds containing a metal element may be metal oxides each containing a different metal element.

Further, the $Al^{3+}$-containing solution and the $Ba^{2+}$-containing solution may be solutions chosen from a group comprising nitrides, acetates, hydrates, and mixtures thereof. For example, the $Ba^{2+}$-containing solution may be a solution of $Ba(CH_3CO)_2$ and the $Al^{3+}$-containing solution may be a solution of aluminium nitrate $Al(NO_3)_3$. The content of $Ba^{2+}$ in the ceramic material is adjusted to reduce the high temperature power loss and/or leakage current of the ceramic made of the ceramic material, and to improve the non-linearity of the I/V curve of a varistor containing a ceramic body made of the ceramic material.

According to one embodiment the ceramic material has a sintering temperature of between 1020° C. inclusive and 1060° C. inclusive. This reduced sintering temperature requires less energy. This is advantageous in view of environment protection and enables a fast production of varistor devices containing ceramics made of the ceramic material. Further, the evaporation of the $Bi_2O_3$ is thermodynamically depressed leading to less evaporation of $Bi_2O_3$ while reducing possible composition deviations and possible inhomogeneity induced by sintering.

Homogeneity of the ceramic leads to homogeneity of the current distribution in a varistor made of the ceramic material during operation being crucial for the energy capacity of a varistor device.

Thus, the ZnO based ceramic material according to the above mentioned embodiments may be used for metal oxide varistors (MOVs) which can be used in gas isolated arresters (GIS). The ultrahigh varistor gradient of the ceramics made of the ceramic material enables a miniaturization and design simplification of the arrester devices. Further, the ceramics show reduced high temperature power loss preventing the thermal run-away even under worse heat dissipation conditions.

Further, a varistor is provided comprising a ceramic body containing a sintered ceramic material according to the above-mentioned embodiments. Due to the composition of the ceramic material the varistor can be called a metal oxide varistor (MOV). The varistor may have a varistor gradient $E_{1\ mA}$ of between 480 V/mm inclusive and 640 V/mm inclusive. Thus, an ultra-high gradient of the varistor is provided. Such a varistor may, for example, be used in compact GIS arresters.

Due to use of a ceramic material according to one of the above mentioned embodiments in a varistor the varistor has several advantageous properties. For example, the quantity of secondary phases in the ceramic body can be well reduced due to the composition of the ceramic material.

In conventional varistor ceramics, the grain size is controlled by spinel phase ($Zn_7Sb_2O_{12}$) which is actually not active in varistor responses. The formation of the spinel phase during sintering consumes quite a lot of ZnO out of the composition of the ceramic material (1 mol $Sb_2O_3$ corresponds to 7 mol ZnO). Therefore, for a composition containing 2 mol % $Sb_2O_3$ about 14 mol % of the ZnO would be taken by the spinel phase and maximal 86 mol % of ZnO would be available for forming varistor grain boundaries in the final ceramic. A high content of the spinel phase also reduces the connectivity of the ZnO grain boundaries. As a consequence, the volume efficiency is strongly limited, especially when the higher varistor gradient has to be achieved by increasing the spinel phase to reduce the grain size.

Introduced $Y_2O_3$ in the ceramic material can react with $Bi_2O_3$, $Sb_2O_3$, and a small quantity of ZnO (comparable to that of $Sb_2O_3$) during sintering and form very fine particles (less than one micron in diameter) which depress the grain growth more effectively than spinel. Thus, the ultra-high varistor gradient can be achieved with a reduced content of $Sb_2O_3$, e.g., as low as 1.2 mol %, in the ceramic material. The reduced content of $Sb_2O_3$ (or spinel phase in the final ceramic) and of other additives as a whole (≤5 mol %) lead to a high volume efficiency of the varistor containing the ceramic made of the ceramic material.

Additionally, the ceramic body of the varistor made of the ceramic material has a desirable high temperature power loss $P_{COV}$ at 190° C. in dependence of device design, and excellent steepness s7 (being the relation of the clamping gradient $E_{10\ kA}$ to the varistor gradient $E_{1mA}$:$E_{10kA}/E_{1mA}$), especially a steepness s7 being ≤1.5. These properties are also suitable for a ceramic of varistors to be used in GIS arresters with reduced size and worsened heat dissipation conditions.

Thus, the height reduction of the MOV can be fulfilled by use of the ceramic material as the varistor gradient is appreciably increased and at the same time the high temperature power loss of the MOV is decreased.

It is to be understood that features mentioned in context of the ceramic material apply also to the varistor and features mentioned in context of the varistor apply also to the ceramic material.

Further, a method of preparing the ceramic material according to one of the above-mentioned embodiments is provided. The method has the preparation steps of weighing, mixing and ball-milling a first part of additives, adding ZnO and a second part of additives, forming a homogenous slurry, and spray-drying the slurry to form a granule of the ceramic material. The first part of additives may be at least one compound containing a metal element, wherein the metal element is chosen from a group comprising Bi, Sb, Co, Mn, Ni, Y, and Cr and the second part of additives may be at least one of an $Al^{3+}$-containing solution, and a $Ba^{2+}$-containing solution.

For example, the additives $Bi_2O_3$, $Sb_2O_3$, $Y_2O_3$, $CO_3O_4$, $Cr_2O_3$, $Mn_3O_4$, and NiO or other types of oxides, carbonates, acetates, nitrides with the equivalent quantity of metal elements are weighed, mixed and ball-milled, for example, in water, to get a desired particle size distribution. The main component ZnO may be added in the form of powder and introduced together with, for example, an $Al^{3+}$- and a $Ba^{2+}$-containing solution in form of nitrides, acetates or hydrides into the system. For forming a homogenous slurry additional water and some organics such as, for example, binders, dispersing agents, defoaming agents may be further introduced and a homogenous slurry of desirable viscosity and density can be formed. The spray-drying of the slurry is performed to get a granule of desired diameter, flowability and pressability for the subsequent process steps.

Further, a method of preparing a varistor is provided comprising the preparation steps: forming a ceramic body containing the ceramic material being prepared according to one of the above-mentioned embodiments and applying electrode layers, wherein the ceramic material is sintered at a temperature of between 1020° C. inclusive and 1060° C. inclusive to form the ceramic body.

The forming of the ceramic body may comprise the further steps dry-pressing a granule of the ceramic material prepared with the method mentioned above, debindering the ceramic material and sintering the ceramic material, wherein the steps are performed before sintering.

For example, cylinder-shaped green parts of defined sizes formed from a granule of ceramic material made with the method mentioned above are provided, wherein the defined sizes may depend on the further characterization method. For characteristic properties as varistor gradient $E_{1mA}$, clamping gradient $E_{10kA}$, and leakage current densitiy $J_S$, the dimension of the green parts may be 15.6 mm in diameter and 1.8 mm in thickness. For energy varistor demonstrations, the diameter may be 130 mm to 155 mm and the thickness may be 22 mm. The green parts may be dry-pressed from the granule followed by debindering in air at about 500° C. to remove the organic components. The parts may be then sintered at 1020 to 1060° C. for one to three hours to get a dense and uniform varistor ceramic body.

As electrode layers layers of, for example, Al or Ag may be applied on the top and bottom surface of the ceramic body. Al may be applied, for example, by a Schoop process, wherein molten metal droplets are sputtered on a solid surface to form an electrode. Ag may be applied, for example, by sputtering.

Additionally, on the side surfaces of the ceramic body isolation layers may be applied. For example, a high isolative glaze coating may be applied by spraying and tempering. The glaze coating may comprise glass. The tempering may be performed at a temperature of about 510° C. The application of isolation layers may be performed before the application of electrode layers.

BRIEF DESCRIPTION OF THE DRAWINGS

Embodiments of the ceramic material, the varistor and the methods of preparing the ceramic material and the varistor are further explained in the following by examples and figures.

Equal, similar or apparently equal elements have the same numbers or symbols in the figures. The figures and the proportions of elements in the figures are not drawn to scale. Rather, several elements may be presented disproportionately large for a better presentation and/or a better understanding.

DETAILED DESCRIPTION OF ILLUSTRATIVE EMBODIMENTS

Figure 1:
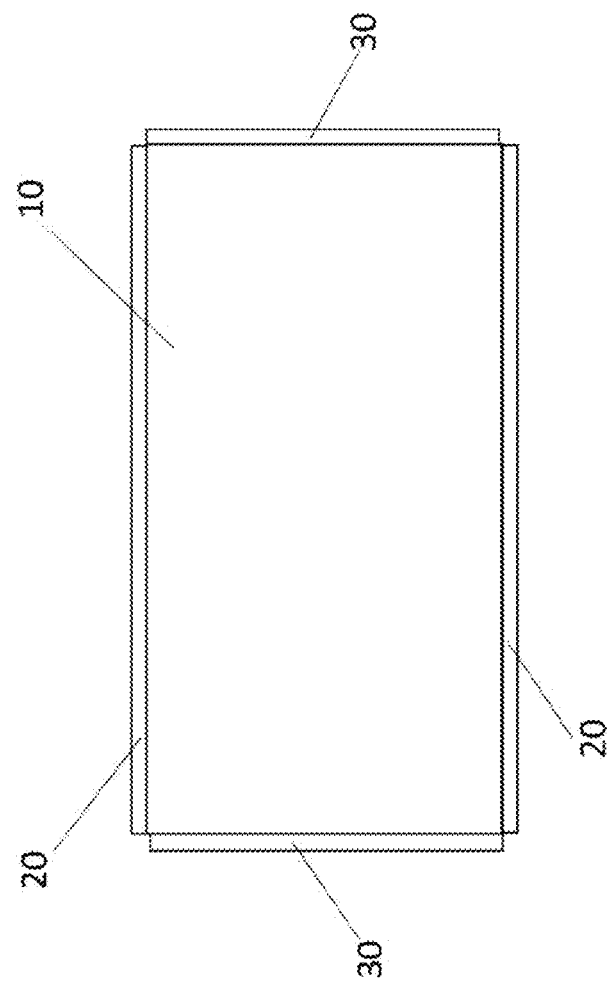
FIG. 1 shows a cross-section of a varistor.

FIG. 1 shows the cross-section of a varistor according to one embodiment. It contains the ceramic body 10, electrode layers 20 and isolation layers 30. For the preparation of the varistor first the ceramic body 10 is formed.

For this, solid state additive raw material as $Bi_2O_3$, $Sb_2O_3$, $Y_2O_3$, $Co_3O_4$, $Cr_2O_3$, $Mn_3O_4$ and NiO (or other types of oxides, carbonates, acetates, or nitrides with the equivalent quantity of metal elements) are weighed, mixed and ball-milled in water to get the desired particle size distribution. The main component ZnO is then introduced in form of a powder together with the $Al^{3+}$- and $Ba^{2+}$-solution (in terms of nitrides, acetates or hydrates) into the system. Additional water and some organics (e.g., binder, dispersing agent, defoaming agent) are further introduced to form a homogeneous slurry of desirable viscosity, density, or solid content. A granule of desired diameter and size distribution, packing density, flowability and pressability is then produced by spray-dry method out of the slurry.

The size of the further formed cylinder-shaped green parts containing the granules of ceramic material depends on the further characterization method: for example, for electric characterization disk-shaped green parts of 15.6 mm in diameter and 1.8 mm in thickness are dry-pressed from the granule, followed by debindering in air at about 500° to remove the organic components. The discs are then sintered at 1040° C. for three hours to get a dense ceramic body. The top and bottom surfaces are metallized, for example, with Ag by sputtering.

For energy varistors as shown in FIG. 1, the side surface of the ceramic part is coated with a layer of high isolative glaze by spraying and tempering to form the isolation layer 30. The top and bottom surfaces are ground to remove the contaminated glaze and to get desired height and surface quality. The top and bottom surfaces are fully metallized, for example, with Al by Schoop-process.

In the following, several examples for ceramic materials and ceramics made thereof are shown.

The samples E01 to E43 described in table 1 explain the correlation between the contents of additives and varistor gradient $E_{1\ mA}$ under defined process conditions. Within the specified range of each component, including ZnO and other additives, the varistor gradient strongly depends on the relative content of the most relevant additive components $Bi_2O_3$, $Sb_2O_3$, $Y_2O_3$, $Co_3O_4$, $Cr_2O_3$, $Mn_3O_4$, NiO and $Al^{3+}$. The dependence can be expressed by a linear correlation between $E_{1\ mA}$ and the composition factor F, wherein F is the function of the content of $Co_3O_4$ ($c_1$), $Mn_3O_4$ (m), $Sb_2O_3$ (s), $Cr_2O_3$ ($c_2$), $Al^{3+}$ (a), $Y_2O_3$ (y), $Bi_2O_3$ ($b_1$), and ZnO (z):

$$F=(c_1+5c_2+2s+4y-m-250a)(1-z)/b_1$$

To get a desired varistor gradient, e.g., $E_{1mA}$ is between 480 V/mm inclusive and 640 V/mm inclusive, the content of the additives should be adjusted so that the factor F is between 0.26, preferably 0.27 inclusive and 0.43 inclusive.

The samples E01 to E43 are prepared as mentioned with respect to FIG. 1, wherein disk-shaped green parts of 15.6 mm in diameter and 1.8 mm in thickness are dry-pressed from the granule, followed by debindering in air at about 500° C. to remove the organic components. The disks are then sintered at 1040° C. for three hours to get dense ceramic bodies.

For the characterization of the samples, the discs are metallized at the top and bottom surface with Ag by sputtering. The electric properties of the metallized parts are characterized and then normalized to an energy varistor of 125 mm in diameter and 18 mm in height for a fair comparison.

The varistor gradient $E_{1\ mA}$ is measured with a low DC current, which gives a current density of 1 mA over a ceramic disc of 125 mm in diameter (or about 10 µA/cm²). The clamping gradient $E_{10\ kA}$ is measured with 8/20 µs discharging wave, and gives a current density of 10 kA over a ceramic disc of 125 mm in diameter (or about 100 A/cm²). The steepness s7 is equal to $E_{10kA}/E_{1mA}$. The leakage current density at room temperature and at 170°, $J_S$, is measured under DC field of 0.75 $E_{1mA}$.

Table 1 shows the composition of each example E01 to E43, wherein the contents of ZnO and the additives are given in mol %, the factor F and the varistor gradient $E_{1mA}$. It can be seen that, for a factor F which is between 0.27 and 0.43 the varistor gradient is in the desirable range between 480 V/mm and 640 V/mm. If factor F is bigger or smaller than 0.43 and 0.27, respectively, the desirable range of the varistor gradient cannot be achieved (examples E03, E06 to E08, E18, E23 and E24).

TABLE 1

| Examples | ZnO | $Bi_2O_3$ | $Co_3O_4$ | $Mn_3O_4$ | $Sb_2O_3$ | $Cr_2O_3$ | NiO | $Ba^{2+}$ | $Al^{2+}$ | $Y_2O_3$ | F | $E_{1\,mA}$ (V/mm) |
|---|---|---|---|---|---|---|---|---|---|---|---|---|
| E01 | 95.5 | 0.47 | 0.51 | 0.27 | 1.81 | 0.093 | 0.97 | 0.0086 | 0.0059 | 0.31 | 0.39 | 611 |
| E02 | 95.4 | 0.47 | 0.61 | 0.27 | 1.82 | 0.093 | 0.97 | 0.0086 | 0.0059 | 0.31 | 0.41 | 621 |
| E03 | 95.1 | 0.48 | 0.51 | 0.27 | 2.20 | 0.094 | 0.98 | 0.0087 | 0.0059 | 0.31 | 0.50 | 668 |
| E04 | 95.5 | 0.47 | 0.51 | 0.27 | 1.81 | 0.093 | 0.97 | 0.0086 | 0.0059 | 0.31 | 0.39 | 606 |
| E05 | 95.5 | 0.47 | 0.51 | 0.27 | 1.81 | 0.093 | 0.97 | 0.0086 | 0.0041 | 0.31 | 0.43 | 642 |
| E06 | 95.4 | 0.47 | 0.61 | 0.27 | 1.82 | 0.093 | 0.97 | 0.0086 | 0.0041 | 0.31 | 0.45 | 682 |
| E07 | 95.3 | 0.47 | 0.71 | 0.27 | 1.82 | 0.093 | 0.97 | 0.0087 | 0.0041 | 0.31 | 0.47 | 689 |
| E08 | 95.2 | 0.48 | 0.82 | 0.27 | 1.82 | 0.093 | 0.97 | 0.0087 | 0.0041 | 0.31 | 0.49 | 698 |
| E09 | 95.9 | 0.47 | 0.50 | 0.27 | 1.44 | 0.092 | 0.98 | 0.0085 | 0.0041 | 0.31 | 0.33 | 572 |
| E10 | 95.7 | 0.47 | 0.71 | 0.27 | 1.44 | 0.092 | 0.96 | 0.0086 | 0.0041 | 0.31 | 0.36 | 575 |
| E11 | 95.7 | 0.47 | 0.71 | 0.27 | 1.44 | 0.092 | 0.96 | 0.0086 | 0.0029 | 0.31 | 0.39 | 625 |
| E12 | 95.9 | 0.47 | 0.70 | 0.27 | 1.19 | 0.092 | 0.95 | 0.0085 | 0.0041 | 0.42 | 0.35 | 556 |
| E13 | 95.5 | 0.57 | 0.71 | 0.27 | 1.46 | 0.092 | 0.96 | 0.0086 | 0.0041 | 0.43 | 0.36 | 604 |
| E14 | 95.8 | 0.47 | 0.71 | 0.19 | 1.44 | 0.092 | 0.96 | 0.0086 | 0.0041 | 0.31 | 0.36 | 597 |
| E15 | 95.8 | 0.47 | 0.71 | 0.27 | 1.44 | 0.000 | 0.96 | 0.0086 | 0.0041 | 0.31 | 0.31 | 568 |
| E16 | 96.0 | 0.47 | 0.71 | 0.27 | 1.44 | 0.092 | 0.67 | 0.0086 | 0.0041 | 0.31 | 0.34 | 581 |
| E17 | 96.1 | 0.47 | 0.70 | 0.27 | 1.19 | 0.000 | 0.95 | 0.0085 | 0.0029 | 0.31 | 0.28 | 491 |
| E18 | 96.4 | 0.46 | 0.70 | 0.26 | 0.95 | 0.000 | 0.95 | 0.0085 | 0.0016 | 0.31 | 0.25 | 452 |
| E19 | 95.9 | 0.47 | 0.71 | 0.19 | 1.44 | 0.000 | 0.96 | 0.0086 | 0.0041 | 0.31 | 0.32 | 554 |
| E20 | 96.0 | 0.47 | 0.71 | 0.11 | 1.44 | 0.000 | 0.96 | 0.0085 | 0.0041 | 0.31 | 0.32 | 538 |
| E21 | 96.3 | 0.47 | 0.70 | 0.11 | 1.19 | 0.000 | 0.95 | 0.0085 | 0.0040 | 0.31 | 0.26 | 471 |
| E22 | 96.3 | 0.47 | 0.70 | 0.11 | 1.19 | 0.000 | 0.95 | 0.0085 | 0.0029 | 0.31 | 0.28 | 504 |
| E23 | 97.1 | 0.32 | 0.48 | 0.18 | 0.99 | 0.000 | 0.66 | 0.0084 | 0.0040 | 0.21 | 0.19 | 437 |
| E24 | 94.5 | 0.62 | 0.94 | 0.38 | 1.92 | 0.000 | 1.28 | 0.0088 | 0.0042 | 0.41 | 0.45 | 656 |
| E25 | 95.8 | 0.47 | 0.71 | 0.27 | 1.44 | 0.000 | 0.96 | 0.0060 | 0.0041 | 0.31 | 0.31 | 554 |
| E26 | 95.8 | 0.47 | 0.71 | 0.27 | 1.44 | 0.000 | 0.96 | 0.0086 | 0.0041 | 0.31 | 0.31 | 552 |
| E27 | 95.8 | 0.47 | 0.71 | 0.27 | 1.44 | 0.000 | 0.96 | 0.0086 | 0.0041 | 0.31 | 0.31 | 543 |
| E28 | 95.7 | 0.47 | 0.81 | 0.27 | 1.44 | 0.000 | 0.96 | 0.0086 | 0.0041 | 0.31 | 0.33 | 553 |
| E29 | 95.9 | 0.47 | 0.71 | 0.27 | 1.38 | 0.000 | 0.96 | 0.0088 | 0.0029 | 0.31 | 0.32 | 560 |
| E30 | 98.0 | 0.47 | 0.71 | 0.27 | 1.32 | 0.000 | 0.96 | 0.0085 | 0.0029 | 0.31 | 0.31 | 537 |
| E31 | 95.9 | 0.47 | 0.61 | 0.27 | 1.32 | 0.000 | 0.96 | 0.0086 | 0.0029 | 0.31 | 0.33 | 544 |
| E32 | 95.9 | 0.47 | 0.71 | 0.19 | 1.44 | 0.000 | 0.95 | 0.0103 | 0.0041 | 0.31 | 0.32 | 660 |
| E33 | 95.1 | 0.43 | 0.70 | 0.19 | 1.19 | 0.000 | 0.95 | 0.0085 | 0.0040 | 0.42 | 0.32 | 560 |
| E34 | 96.1 | 0.47 | 0.70 | 0.19 | 1.19 | 0.000 | 0.95 | 0.0085 | 0.0040 | 0.42 | 0.30 | 534 |
| E35 | 96.0 | 0.50 | 0.70 | 0.19 | 1.19 | 0.000 | 0.95 | 0.0085 | 0.0041 | 0.42 | 0.28 | 512 |
| E36 | 96.1 | 0.43 | 0.70 | 0.19 | 1.19 | 0.000 | 0.95 | 0.0085 | 0.0040 | 0.38 | 0.31 | 540 |
| E37 | 96.1 | 0.47 | 0.70 | 0.19 | 1.19 | 0.000 | 0.95 | 0.0102 | 0.0040 | 0.42 | 0.30 | 545 |
| E38 | 96.0 | 0.47 | 0.70 | 0.27 | 1.19 | 0.000 | 0.95 | 0.0085 | 0.0041 | 0.42 | 0.30 | 524 |
| E39 | 96.1 | 0.47 | 0.60 | 0.27 | 1.19 | 0.000 | 0.95 | 0.0085 | 0.0040 | 0.42 | 0.29 | 521 |
| E40 | 96.2 | 0.46 | 0.50 | 0.26 | 1.19 | 0.000 | 0.95 | 0.0085 | 0.0040 | 0.42 | 0.27 | 514 |
| E41 | 96.2 | 0.46 | 0.60 | 0.19 | 1.19 | 0.000 | 0.95 | 0.0085 | 0.0040 | 0.42 | 0.29 | 531 |
| E42 | 96.1 | 0.46 | 0.60 | 0.26 | 1.10 | 0.000 | 0.95 | 0.0085 | 0.0040 | 0.46 | 0.28 | 503 |
| E43 | 96.2 | 0.46 | 0.60 | 0.26 | 1.01 | 0.000 | 0.95 | 0.0084 | 0.0040 | 0.50 | 0.27 | 485 |

Figure 2:
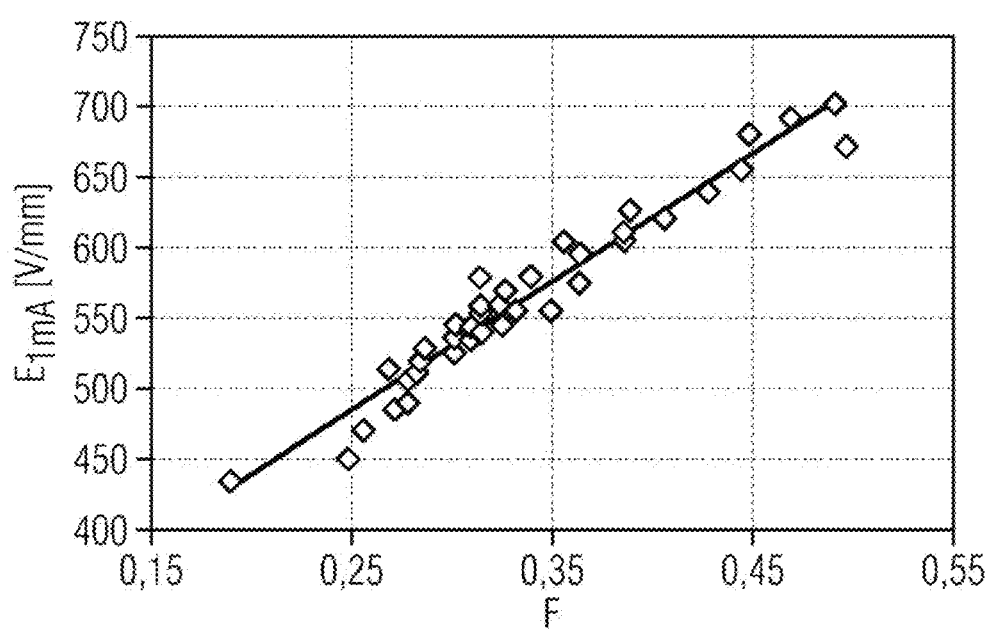
FIG. 2 shows the dependence of varistor gradient $E_{1\ mA}$ on the composition factor F.

The dependence of the varistor gradient on the composition factor F is also shown in FIG. 2 where the correlation between $E_{1\,mA}$ and F can be clearly seen.

Figure 3:
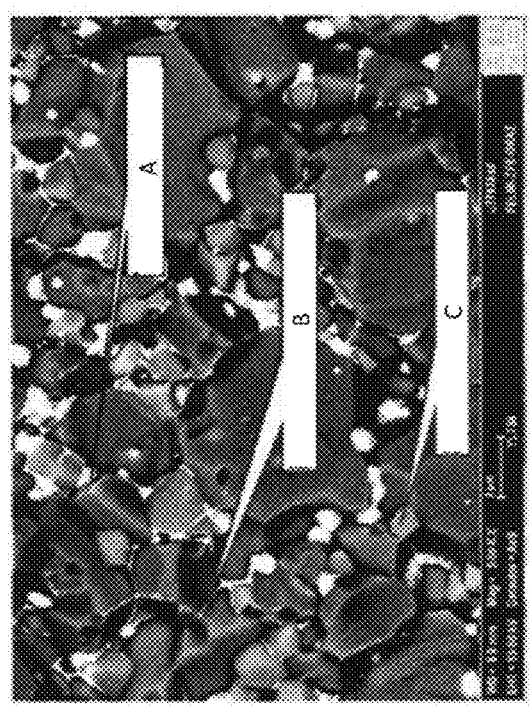
FIG. 3 shows a picture of the microstructure of one embodiment of the ceramic made of the ceramic material.

The expression of F reflects the effectiveness of a respective component affecting the varistor gradient which is actually determined by grain size and the grain boundary potential formed during sintering. The grain growth is mainly controlled by the formation and distribution of the secondary phases, e.g., spinel phase $Zn_7Sb_2O_{12}$, and Y—Bi-rich phase as can be seen in FIG. 3. In FIG. 3 the microstructure of the exemplary sample E15 ceramic is shown. A shows a Y—Bi-rich phase, B shows a Bi-rich liquid phase and C shows a spinel phase $Zn_7Sb_2O_{12}$.

A spinel phase is characterized with a grain size of 2 to 4 m, while the Y—Bi-rich phase has a much smaller size of sub-micron in diameter. As a consequence, the introduction of $Y_2O_3$ brings about double effectiveness in comparison with that of $Sb_2O_3$ in achieving the desired varistor gradient. The formation of spinel phase consumes much ZnO and is not favourable for high volume efficiency. By introducing 1 mol % $Sb_2O_3$, about 7 mol % of the ZnO would be taken by the spinel phase and the effective varistor volume fraction (ZnO grains) has to be reduced by so much. In contrast, the Y—Bi-rich phase grains have a small content of ZnO and have minor influence on the volume efficiency. Accordingly, ultra-high gradient varistor ceramics with reduced $Sb_2O_3$ content (e.g., 1.1 mol % to 1.2 mol %) can be achieved by collaboratively varying the contents of other additives so that the factor F is within a certain scale (e.g., the compositions of E12, E22 and E33 to E42).

Samples E44 to E46 are listed in Table 2 together with samples E15 and E25, and show the influence of $Ba^{2+}$-content on the high temperature leakage current $J_S$ and steepness characteristic s7.

TABLE 2

| Examples | ZnO | $Bi_2O_3$ | $Co_3O_4$ | $Mn_3O_4$ | $Sb_2O_3$ | $Cr_2O_3$ | NiO | $Ba^{2+}$ | $Al^{2+}$ | $Y_2O_3$ | $E_{1mA}$ (V/mm) | S7 | $J_s$ (A/cm$^2$) |
|---|---|---|---|---|---|---|---|---|---|---|---|---|---|
| E15 | 95.8 | 0.47 | 0.71 | 0.27 | 1.44 | 0.000 | 0.96 | 0.0086 | 0.0041 | 0.31 | 568 | 1.57 | 1.91 10$^{-5}$ |
| E25 | 95.8 | 0.47 | 0.71 | 0.27 | 1.44 | 0.000 | 0.96 | 0.0060 | 0.0041 | 0.31 | 554 | 1.61 | 2.07 10$^{-5}$ |
| E44 | 95.8 | 0.47 | 0.71 | 0.27 | 1.44 | 0.000 | 0.96 | 0.0000 | 0.0041 | 0.31 | 492 | 1.61 | 3.45 10$^{-5}$ |

TABLE 2-continued

| Examples | ZnO | $Bi_2O_3$ | $Co_3O_4$ | $Mn_3O_4$ | $Sb_2O_3$ | $Cr_2O_3$ | NiO | $Ba^{2+}$ | $Al^{2+}$ | $Y_2O_3$ | $E_{1mA}$ (V/mm) | S7 | $J_s$ (A/cm$^2$) |
|---|---|---|---|---|---|---|---|---|---|---|---|---|---|
| E45 | 95.8 | 0.47 | 0.71 | 0.27 | 1.44 | 0.000 | 0.96 | 0.0103 | 0.0041 | 0.31 | 524 | 1.61 | 1.88 10$^{-5}$ |
| E46 | 95.8 | 0.47 | 0.71 | 0.27 | 1.44 | 0.000 | 0.96 | 0.0172 | 0.0041 | 0.31 | 531 | 1.62 | 1.70 10$^{-5}$ |

Figure 4:
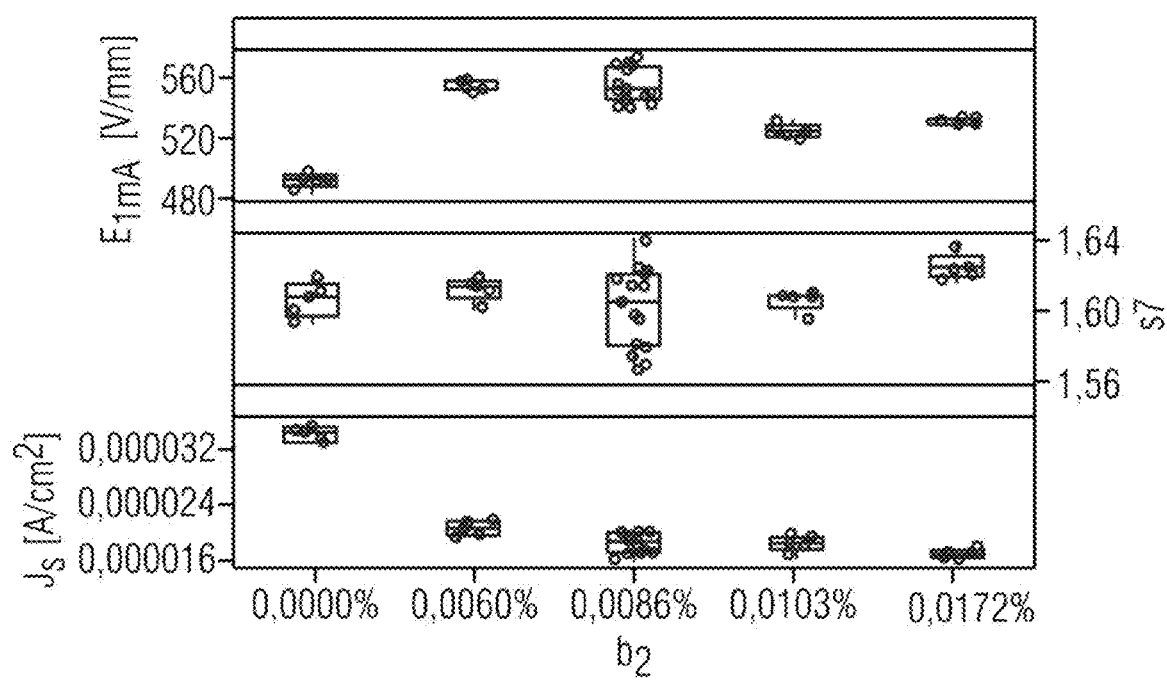
FIG. 4 shows the dependence of several electric properties on the content of $Ba^{2+}$.

The compositions listed in Table 2 all have the same amount of additives except the content of $Ba^{2+}$. The contents of ZnO and the additives are given in mol %. The preparation process and electric characterization are the same as described, for examples, E01 to E43. The basic electric properties as a function of the $Ba^{2+}$-content $b_2$ are plotted in FIG. 4. Here, the content of $Ba^{2+}$ $b_2$ is plotted against the high temperature leakage current $J_S$, the steepness s7 and the varistor gradient $E_{1mA}$. The circles in FIG. 4 are the respective measured values of the samples, the boxes are statistic representations of the scattering (e.g., median, mean, maximum, minimum etc. value, depending on the definition in the plotting). Apparently, a trace amount as low as 0.0060% of $Ba^{2+}$ can effectively reduce the high temperature leakage current density $J_S$, which is crucial for the energy capability in device operation. A further increase of $b_2$ leads to even lower leakage current, but the steepness s7 gets worse when the $b_2$ exceeds 0.0150%.

The samples E47 to E49, listed in Table 3 together with samples E10, E15 and E19, are prepared out of the same compositions as E10, E15 and E19 respectively except that the dimensions of the green parts before debindering and sintering are 150 mm in diameter and 25 mm in height. Thus, in Table 3, the sample number (examples), the composition, the diameter D and the thickness T are listed together with the electric properties varistor gradient $E_{1mA}$, steepness s7, high temperature leakage current $J_S$ and high temperature power loss $P_{cov}$.

TABLE 3

| Examples | Composition | D (mm) | T (mm) | $E_{1mA}$ (V/mm) | S7 | $J_s$ (A/cm$^2$) | $P_{cov}$ (W) |
|---|---|---|---|---|---|---|---|
| E10 | E10 | 13 | 1.5 | 575 | 1.60 | 1.97 10$^{-5}$ | |
| E47 | E10 | 125 | 18 | 548 | 1.50 | | 20.6 |
| E15 | E15 | 13 | 1.5 | 568 | 1.57 | 1.91 10$^{-5}$ | |
| E48 | E15 | 125 | 18 | 545 | 1.48 | | 14.5 |
| E19 | E19 | 13 | 1.5 | 554 | 1.60 | 1.54 10$^{-5}$ | |
| E49 | E19 | 125 | 18 | 512 | 1.51 | | 12.9 |

The debindering and sintering conditions are the same as the small discs in examples E01 to E46. A layer of glass material is then sprayed on the side surface of the sample, followed by tempering at 510° C. to get a dense and highly isolative glaze coating. The parts are then ground on both main sides to desired thickness, e.g., 18 mm. Aluminum metallization is provided on the top and bottom surface for electric contacting, for example, by Schoop-process. The basic electric properties are characterized (the high temperature power loss $P_{COV}$ instead of $J_S$ is measured at 190° C. under a 50 Hz-AC field of $E_{10kA}/2.75$ in amplitude) and compared with a small disc of examples E10, E15 and E19. Basically, the varistor gradient $E_{1mA}$ of the small discs could be well reproduced with a slight offset of about 5%, while the steepness s7 drifts to lower values due to the size effect. Lower $P_{COV}$ could be expected for materials of lower $J_S$ as both arise from the same physical effect (high temperature resistance).

So it could be shown that the ZnO-based ceramic materials can be used for metal oxide varistors used in gas-isolated arrestors. The ultra-high varistor gradient of these materials is essential for miniaturization and design simplification of the arrestor devices.

The scope of protection of the invention is not limited to the examples given herein above. The invention is embodied in each novel characteristic and each combination of characteristics, which particularly includes every combination of any features which are stated in the claims, even if this feature or this combination of features is not explicitly stated in the claims or in the examples.

We claim:

1. A ceramic material comprising:
ZnO as a main component; and
additives comprising an $Al^{3+}$-containing solution, a $Ba^{2+}$-containing solution, a compound comprising Bi, a compound comprising Sb, a compound comprising Co, a compound comprising Mn, a compound comprising Ni, and a compound comprising Y,
wherein $c_1$ is an equivalent content of Co in $Co_3O_4$, m is an equivalent content of Mn in $Mn_3O_4$, s is an equivalent content of Sb in $Sb_2O_3$, a is an content of $Al_{3+}$, y is an equivalent content of Y in $Y_2O_3$, $b_1$ is an equivalent content of Bi in $Bi_2O_3$, n is an equivalent content of Ni in NiO, and $b_2$ is an content of $Ba_{2+}$, and
wherein
0.40 mol % ≤ $b_1$ ≤ 0.55 mol %,
1.10 mol % ≤ s ≤ 1.90 mol %,
0.50 mol % ≤ $c_1$ ≤ 0.80 mol %,
0.20 mol % ≤ m ≤ 0.30 mol %,
0.70 mol % ≤ n ≤ 1.20 mol %,
0.25 mol % ≤ y ≤ 0.45 mol %,
0.003 mol % ≤ a ≤ 0.006 mol %, and
0.005 mol % ≤ $b_2$ ≤ 0.015 mol %.

2. The ceramic material according to claim 1, wherein a content of the additives in the ceramic material is ≤5 mol %.

3. The ceramic material according to claim 1, wherein at least one compound is selected from the group consisting of metal oxides, metal carbonates, metal acetates, metal nitrides and mixtures thereof.

4. The ceramic material according to claim 1, wherein the compounds are $Bi_2O_3$, $Sb_2O_3$, $Co_3O_4$, $Mn_3O_4$, NiO, and $Y_2O_3$.

5. The ceramic material according to claim 1, wherein the $Al^{3+}$-containing solution and the $Ba^{2+}$-containing solution are solutions selected from the group consisting of nitrides, acetates, hydrates, and mixtures thereof.

6. The ceramic material according to claim 1, wherein the ceramic material has a sintering temperature of between 1020° C. inclusive and 1060° C. inclusive.

7. The ceramic material according to claim 1, wherein the compound comprising Mn is $Mn_3O_4$.

8. The ceramic material according to claim 1, wherein the compound comprising Ni is NiO.

9. The ceramic material according to claim 1, wherein the compound comprising Sb is $Sb_2O_3$.

10. The ceramic material according to claim 1, wherein the compound comprising Bi is $Bi_2O_3$.

11. The ceramic material according to claim 1, further comprising a compound comprising Cr, wherein $c_2$ is an equivalent content of Cr in $Cr_2O_3$, and wherein 0.00 mol % $\leq c_2 \leq$ 0.10 mol %.

12. The ceramic material according to claim 11, wherein $(c_1+5c_2+2s+4y-m-250a)(1-z)/b_1=F$, and wherein $0.27 \leq F \leq 0.43$ and z is a content of ZnO.

13. The ceramic material according to claim 11, wherein the compound comprising Cr is $Cr_2O_3$.

14. The ceramic material according to claim 11, wherein the compound comprising Co is $Co_3O_4$.

15. A method for forming the ceramic material according to claim 1, the method comprising:
weighing, mixing and ball-milling a first part of additives;
adding the ZnO, and a second part of additives;
forming a homogeneous slurry; and
spray-drying the slurry to form a granule of the ceramic material.

16. The method according to claim 15, wherein the first part of additives is at least one compound containing a metal element, wherein the metal element is selected from the group consisting of Bi, Sb, Co, Mn, Ni, Y, and Cr, and wherein the second part of additives is at least one of the $Al_{3+}$-containing solution or the $Ba_{2+}$-containing solution.

17. A method for forming a varistor, the method comprising:
forming a ceramic body comprising the ceramic material formed according to claim 15; and
applying electrode layers on the ceramic body, wherein the ceramic material is sintered at a temperature of between 1020° C. inclusive and 1060° C. inclusive to form the ceramic body.

18. The method according to claim 17, wherein forming the ceramic body further comprises:
dry-pressing the granule of the ceramic material; and
debindering the ceramic material.

19. A varistor comprising:
a ceramic body containing a sintered ceramic material according to claim 1.

20. The varistor according to claim 19, wherein the varistor has a varistor gradient $E_{1mA}$ of between 480 V/mm inclusive and 640 V/mm inclusive.

* * * * *

UNITED STATES PATENT AND TRADEMARK OFFICE
CERTIFICATE OF CORRECTION

PATENT NO.       : 11,031,159 B2                                    Page 1 of 1
APPLICATION NO.  : 16/085940
DATED            : June 8, 2021
INVENTOR(S)      : Yongli Wang It is certified that error appears in the above-identified patent and that said Letters Patent is hereby corrected as shown below:

In the Claims

Claim 1, Column 10; Line 22 delete "$Al_{3+}$" and "$Ba_{2+}$" insert -- $Al^{3+}$ -- and insert -- $Ba^{2+}$ --

Claim 1, Column 10; Line 53 delete "$\leq 0.015$ mol%" insert -- $\leq 0.15$ mol% --

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*